(12) United States Patent
Pawloski

(10) Patent No.: US 7,694,629 B2
(45) Date of Patent: Apr. 13, 2010

(54) METHOD AND SYSTEM FOR CONTROLLING SMALL WILD ANIMALS AND RODENTS

(76) Inventor: Daniel Pawloski, 101 N. Rensselear St., Griffith, IN (US) 46319

( * ) Notice: Subject to any disclaimer, the term of this patent is extended or adjusted under 35 U.S.C. 154(b) by 9 days.

(21) Appl. No.: 12/082,386

(22) Filed: Apr. 10, 2008

(65) Prior Publication Data
US 2009/0255434 A1 Oct. 15, 2009

(51) Int. Cl.
*F42B 6/10* (2006.01)
*A01K 29/00* (2006.01)
*A63B 41/00* (2006.01)

(52) U.S. Cl. .................. 102/502; 102/513; 119/712; 473/577

(58) Field of Classification Search .......... 102/502, 102/513, 370; 119/712, 843; 124/56; 43/1; 473/577
See application file for complete search history.

(56) References Cited

U.S. PATENT DOCUMENTS

| | | | | |
|---|---|---|---|---|
| 3,791,303 | A * | 2/1974 | Sweeney et al. | 102/502 |
| 4,839,985 | A * | 6/1989 | Barry | 43/132.1 |
| 5,033,446 | A * | 7/1991 | Bradt | 124/26 |
| 5,166,457 | A | 11/1992 | Lorenzetti | 42/49.01 |
| 5,174,807 | A * | 12/1992 | MacDonald | 504/206 |
| 5,254,379 | A * | 10/1993 | Kotsiopoulos et al. | 428/35.7 |
| 5,303,496 | A * | 4/1994 | Kowalkowski | 43/1 |
| 5,456,036 | A * | 10/1995 | Butz | 43/1 |
| 5,639,526 | A * | 6/1997 | Kotsiopoulos et al. | 473/577 |
| 6,199,311 | B1 * | 3/2001 | Foster | 43/1 |
| 6,223,658 | B1 * | 5/2001 | Rosa et al. | 102/501 |
| 6,772,694 | B1 | 8/2004 | Pearce, III et al. | 102/502 |
| 6,880,765 | B2 * | 4/2005 | Tuomikoski et al. | 239/34 |

* cited by examiner

*Primary Examiner*—Bret Hayes
(74) *Attorney, Agent, or Firm*—Thomas J. Schab

(57) ABSTRACT

A new type of animal control system and a new method of use of the animal control system is presented for controlling small, wild animals and rodents without killing or maiming. The control system is in the form of a portable kit that includes a launching device, a plurality of thermoplastic hollow projectiles, a supply of a natural animal control agent for loading into the projectiles, and a means for transferring and storing the control agent. The method of use of the control system involves filling the projectiles with the control agent and then sealing the projectiles prior to loading the projectiles into the launching device. The launching device is then aimed at an area that is being controlled by the animal and then the projectiles are discharged from the gun so as to disperse the control agent about the area being controlled. The control agent causes a biological reaction in the animals and rodents when they detect the scent of the control agent. The biological reaction causes a fear and intimidation response in the brain of the animals and rodents, such that they will voluntarily and permanently vacate the nest out of fear for its life and of its young. The control agent is a urine, marking gland oil or a combination of oil and urine, from a known predator of the animal or rodent.

17 Claims, 3 Drawing Sheets

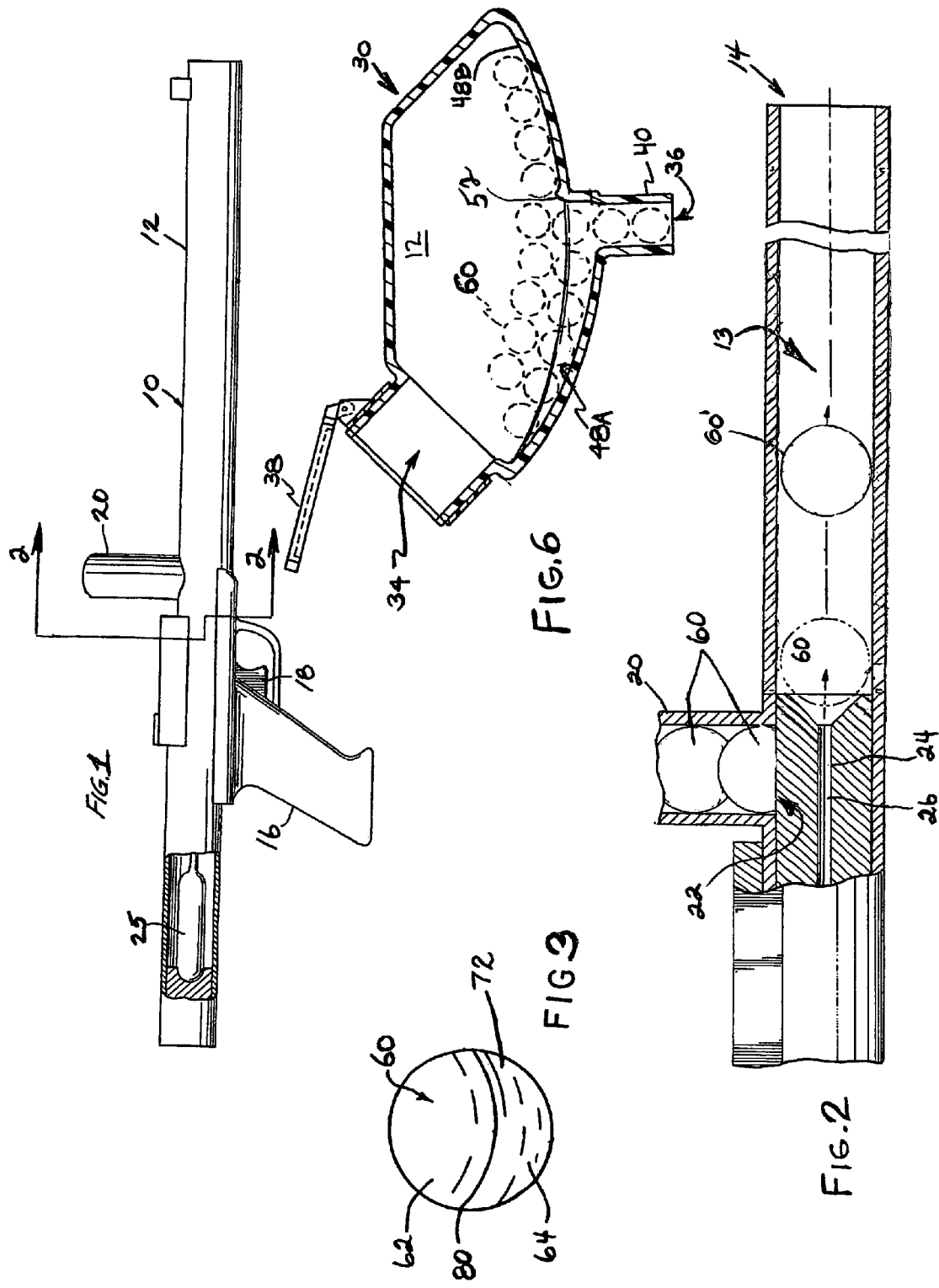

METHOD AND SYSTEM FOR CONTROLLING SMALL WILD ANIMALS AND RODENTS

BACKGROUND OF INVENTION

1. Field of the Invention

This invention relates to an animal and rodent control system and to a method of use of the subject system. In particular, it relates to an animal and rodent control system that is capable of delivering a unique liquid control agent to a targeted area which is considered to be a hazardous area because it is being defended or occupied by a small wild animal such as a raccoon or a rodent such as a possum. More particularly, the invention relates to a system that comprises a portable kit that includes a plurality of hollow, frangible projectiles; a gas or compressed air projectile launching device; a means for filling the projectiles; and a supply of select, natural liquids and/or oils that will be dispensed into the projectiles, said select, natural liquids uniquely capable of permanently repelling the small animal or rodent without the need to maim, kill or harm the animal and/or rodent.

2. Description of the Prior Art

Community expansion and suburban growth has led to the destruction of the natural habitats for many of our small-to-medium sized animals, birds and reptiles. As a result, it is not uncommon to find deer, raccoons, opossums, skunks, badgers, rats, mice and other small animals or rodents resorting to foraging of restaurant or home garbage cans. Furthermore, it is common for some small animals like raccoons, opossums, weasels, squirrels and skunks, to take up residency inside the attic and crawl space areas of homes or in the sheds and pole barns located on the property. Once inside, these small animals are extremely difficult to remove and many of them have been known to carry the rabies virus. The raccoon is also known to be one of the most vicious and tenacious animals out of this group when defending its young or when it feels trapped or cornered.

Along those lines, many forms of traps have been invented to deal with this problem. Early forms of such traps included snares that are designed to choke to death the animal that is snared. Others use clamping jaws or arms to maim the animal to the point it dies or outright kills the animal. The public outcry and lobbying efforts of the PETA organization has led to the development of more humane traps that restrain the animal, thereby allowing the return of the still-alive animal back into the wild. However, a problem with those types of traps is that they require a human to remove the trap and enclosed animal from the area in which it was caught. Many times, a handler of such traps is bitten or scratched by the animal, which leads to the possibility and fear of contracting rabies. Due to the rabies potential, many animal control experts would prefer to outright kill the animal rather than worry about its safety. However, traps that are designed to kill the animal have been outlawed in many areas of the country. Furthermore, whatever type of trap, it must be placed in the same area where the animal is habitating and/or controlling in order for it to be effective. Placing and setting a trap can be extremely dangerous to the animal control expert as most of these animals will fight rather than vacate the area while a trap is being set. Moreover, once the trap is set, many animals will suspiciously avoid going near the trap, making it useless.

In rural areas, farmers take the most expedient and effective means for removing the animal; they simply shoot and kill it. However, that means to an end is not practical in suburban settings for several reasons. First and foremost, are the laws that prevent such measures. Discharging a firearm within city limits is a criminal misdemeanor, as is carrying a gun without a permit. Furthermore, firing live ammunition in a suburban setting could lead to catastrophic results. Moreover, the public outcry against shooting and killing the animals, even if they are considered to be known pests or varmints, would be unending. Furthermore, shooting live ammunition inside a house would likely destroy the area surrounding the target.

Another methodology that has been used with limited success is the use of chemicals and poisons that are designed for digestion by the animal. However, some small animals and rodents have become tolerant to the chemicals and/or poisons. For example, rats have become especially tolerant to certain poisons, while raccoons have been found to be immune to chemical repellents such as benzaldehydes, cinnamic aldehydes, and methyl salicylate, among others. In U.S. Pat. No. 3,686,255, a chemical methodology for repelling small animals is disclosed. There, the inventor claims that certain cyclohexyl compounds and cyclohexyl isocyanates and thiocyanates, when applied to an animal or to its habitat, can act as an effective animal repellent. However, applying these chemicals requires the administrator to directly touch the animal itself or enter the zone being occupied by the animal. In either situation, the administrator is placing himself in an unsafe and compromised position. The inventor is not aware of a commercially available chemical product that has been found to be effective over a broad range of applications with different types of small animals and rodents.

One of the biggest drawbacks of using chemicals and/or poisons for animal control is that these chemicals and poisons are very heavily regulated by the EPA since they are considered hazardous materials. Materials regulated by the EPA require special permits to purchase and use such materials along with extensive training, reporting and inspections. Furthermore, the costs for obtaining the permits, the costs to train, and the special carriers needed to transport and/or dispense such materials create an onerous burden. Many small animal and pest control companies cannot adequately deal with these burdens, let alone afford the licensing fees and other related costs to even consider use of most chemical and/or poisons and methods.

Due to the longstanding nature of the varmint problem, one might expect that an effective and safe solution would be in common use, but this is not the case. There is still a long-felt need to provide an effective means of controlling such small animals without killing or maiming them and doing so in a manner that complies with municipal codes and state laws and regulations that pertain to discharging a firearm within city limits or pertain to the perceived inhumane treatment of these animals or rodents. One such methodology invented by the present applicant, involves the new use of a compressed gas/air launching device to deliver a control agent to an area defended or controlled by a small wild animal or a rodent or even a family of the same. Dispersion of the pre-selected control agent in or about the nesting area of the animal or rodent will permanently rid the area of that animal, and it does so in a manner that does not violate any laws and is completely safe, as will be explained later herein. To date, the inventor is not aware of any system that provides a safe means for an animal control professional to permanently and safely rid an area of an unwanted small wild animal or rodent without the use of chemicals or poisons and which demands no special permits to operate said system.

As mentioned above, the present invention involves the use of a compressed air/gas launching device that fires non-lethal projectiles which are an integral component in controlling the small animals and rodents. Prior to consideration as an animal control system and methodology, the introduction and popularity of compressed air/gas launching devices and their associated projectiles grew out of a new type of interactive game where the participants engaged in pretend, combative war games. In that gaming application, teams of players were provided with a compressed gas launching device, known as a paintball gun, and a number of spherically shaped projectiles, known as paintballs, which function as the ammunition. The paintballs were filled with a non-toxic, water-soluble paint or dye, and when a competitor was struck by a paintball, it would rupture and mark the participant as being "killed," all without injury to the participant. As an outgrowth of the game, the paintball gun was later adapted by police departments and the U.S. military, where similar, but more advanced systems were developed as an effective means for conducting training exercises without the use of live ammunitions.

Police departments have especially embraced paintball systems because steadily-rising crime rates have led to an increased need for technologically-enhanced, non-lethal crime fighting devices in response to the proliferation of excessive use of force claims against law enforcement agencies. Such claims have significantly increased as the public has become more aware of and made more sensitive to the use of lethal force. This has been found to be especially true in situations where lethal force may not be required, such as where suspects are armed with dangerous, but non-lethal objects like sticks, rocks, screwdrivers, chairs, etc. Non-lethal paintball systems were found to be a perfect fit for temporarily incapacitating, slowing, repelling or inhibiting a suspected criminal and/or for marking such individuals for later identification. Moreover, the risk that a criminal will surround himself with or be in close proximity to innocent people when officers are trying to subdue him/her, thereby increases the complexity of subduing a suspect without applying lethal force. In those specific situations, it was common to use non-lethal devices such as stun guns, mace, tear gas, and liquid pepper spray devices that impair the vision, breathing or other physical or mental capabilities of the target. However, those types of non-lethal devices are designed for use when operating in close range to a subject, where the safety of the user may be at risk. The adaptation of paintball gun systems in the implementation of vision and breathing impairing pepper powders and liquids has proven to be very successful and especially beneficial since a paintball can be launched from a safe distance away. However successful these systems were in impairing or incapacitating a human being with the pepper powders, they were never used for animal control purposes or ever tested to determine if they would cause the same reactions in wild animals.

Instead, early improvements related to paintball systems involved the development of an improved, non-lethal projectile for delivering a marking substance to its target. That improvement was disclosed in U.S. Pat. No. 5,254,379, issued to Kotsiopoulos, et al., which is incorporated herein by reference. That disclosure was directed primarily to a paint ball gun and improved projectile that delivered a non-pressurized payload of a paint or dye to a human target and expelled the paint or dye onto the target upon impact so as to "mark" the target. Prior to development of the Kotsiopoulos paintball, a traditional paintball was formed from a pair of hemispheres made of a gelatinous material similar to that used to encase oral medicines. As with the casing of oral medicines, the gelatin paintballs were soluble in water. Water soluble vegetable dyes are often used as the coloring agent added to increase the opacity of the mark left by the breaking paint ball. The vegetable dye colorants, usually being dissolved in water, cause the gelatin based shell of the traditional paintball to dissolve. The same problem occurs with other liquid components, such as chemical mixtures, thereby limiting the applications where a gelatin shell can be used. To combat the difficulties presented by the low water tolerance of a gelatin paintball, the water soluble colorant solutions were commonly mixed with ethylene glycol and polyethylene glycol, or in propylene glycol. However, those mixtures were found to be especially troublesome as they were generally considered to be toxic substances and contact with human skin was found to be problematic. While glycol-based marking colorants prevented the internal destruction of the paintball shell, a gelatin shell paintball nonetheless remained exceedingly vulnerable to the vagaries of the external environment. For instance, rain, sweat from a user's body, and even high humidity were found to alter or damage the gelatin shell on its outside surface, thereby rendering the paintball inaccurate or in many cases unusable. The Kotsiopoulos paint ball on the other hand, was formed of two semi-rigid, plastic shell portions that were joined together to form a rigid paintball shell that was impervious to water. By design, that paintball would entirely fracture upon impact with the target and locally disperse the internal pay load. One drawback of the Kotsiopoulos paintball is that it is a smaller projectile compared to typical gelatin paintballs, such that the volume of the agent carried therein is limited by the smaller, internal volume of the paint ball shell. Subsequently, various other developments were made to improve the gelatin type of paintball projectile so as to improve its range, path of delivery, and effectiveness in dispersing the control agent to specific areas surrounding the target. Such developments are disclosed in U.S. Pat. Nos. 6,546,874, 6,393,992, and 5,965,839, all to Vasel, et al.

In a totally different application, as disclosed in U.S. Pat. No. 6,772,694 to Pierce, III, et al., a paintball gun and projectile were found to be especially useful in the delivery of pesticides, herbicides, fungicides and other biocides to areas that are very difficult to reach or involve hazards in reaching those areas. In that disclosure, a typical paintball gun was used to launch a capsule-like projectile to disperse biocides to the tops of tall trees and for the use in dispensing pesticides to hard-to-reach nests, or nests that were especially dangerous, like hornet or wasp nests. One drawback of the Pierce system was that it had a relatively short effective range of about 30 feet due to the type of projectile being fired.

Other than the above aforementioned applications, the present inventor is unaware of any system that is capable of controlling a small, wild animals or rodents using the methodology and the kit components that are disclosed and described herein.

SUMMARY OF THE INVENTION

It is the primary object of the invention to provide a new use for a typical paintball gun and paintball projectiles, where those components are utilized within a new type of animal control system and a new method of use of the subject system in controlling small wild animals and/or rodents. That primary object is met by providing an animal control system in the form of a portable animal control kit. The kit includes a launching device in the form of a paintball gun; a supply of spherically-shaped, hollow projectiles that are preferably identical paintballs which are made from a thermoplastic linear polymer shell, each shell having a fill port that communicates with an internal cavity therein; a supply of a unique animal and rodent control agent in the form of a urine, marking gland oil, or a combination thereof, that is supplied from an animal that is known to be a natural predator of the small animal or rodent that is to be controlled; and a means for transferring and storing the control agent. The transfer and storage means is used to fill each paintball with the control agent, whereby the paintballs are loaded into and then discharged from the gun so as to impact and spread the control agent about the area occupied by the small animal or rodent. In one version of the kit, an ammunition magazine clip may also be provided, as well as a supply of solid balls that are comprised of nylon or rubber. The balls are extremely hard and they are to be exclusively loaded into the magazine clip. The magazine clip and the hard balls may be required for use in protecting the animal control professional from attack should an animal or rodent be present in its nest, prior to dispersing the control agent.

The transfer and storage means of the invention is preferably comprised of a hypodermic needle that has a storage reservoir for holding the control liquid therein, prior to it being communicated into the cavity of the paintball via the needle. Other embodiments of the transfer and storage means include a bulb diffuser and a baister.

According to another aspect of the invention, a first method is disclosed for exercising control over a small, wild animal and/or rodent. The method comprises the steps of filling a plurality of hollow projectiles with a control agent using a portable transfer and storage means for filling where the control agent comprises of a urine or glandular oil from a known predator of the animal or rodent being controlled; loading the filled projectiles into a launching device; directing the launching device towards a desired target area; and then consecutively actuating the launching device so as to propel the plurality of projectiles to the target, whereby the projectiles explode upon reaching the target to distribute the control agent locally about the target area.

According to another aspect of the invention, a second method is disclosed for exercising control over a small, wild animal and/or rodent. This method comprises the steps of filling a plurality of hollow projectiles with a control agent using a portable means for filling, where the control agent comprises of a urine or glandular oil from a known predator of the animal or rodent being controlled; filling a magazine ammunition clip with a plurality of solid nylon spherical balls; attaching the magazine ammunition clip to the launching device; directing the launching device towards an animal occupying the target area, said animal representing an animal to be controlled; consecutively actuating the launching device so as to propel a plurality of said solid nylon balls at said animal to be controlled so as to strike and disable said animal; removing the ammunition clip from the launching device; loading the filled projectiles into said launching device; directing the launching device towards a desired target area; and then consecutively actuating the launching device so as to propel the plurality of projectiles to the target, whereby the projectiles explode upon reaching the target to distribute the control agent locally about the target area while the animal or rodent is incapacitated.

BRIEF DESCRIPTION OF THE DRAWINGS

The invention will be better understood if reference is made to the accompanying drawings, in which:

FIG. 1 shows a side view of a conventional paintball gun that is used in accordance with the invention;

FIG. 2 is a cross sectional view taken along line 2-2 of FIG. 1, illustrating the barrel portion of the gun corresponding to FIG. 1;

FIG. 3 is a perspective view of a preferred embodiment of a paintball according to the present invention;

FIG. 6 is a cross sectional view of a conventional paintball gun ammunition magazine clip taken along a longitudinal axis of symmetry of the magazine;

DESCRIPTION OF THE PREFERRED EMBODIMENTS

Figure 4:
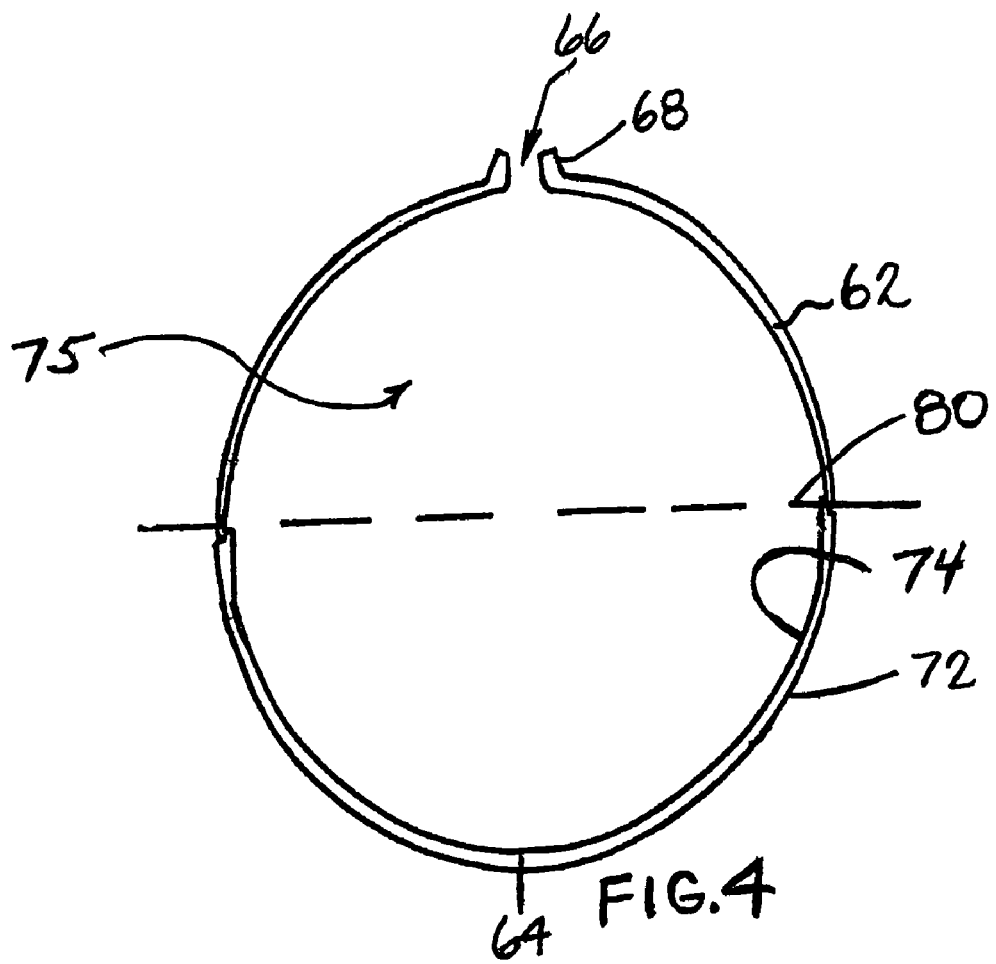
FIG. 4 is a cross sectional view of a paint ball shell prior to being filled with the control liquid that is used in accordance with the invention.

Referring generally to the above figures wherein like numerals indicate like parts, a new method and a new system in the form of a kit has been discovered for effectively controlling small animals and rodents and this system and method is unlike anything previously practiced. This new methodology exhibits characteristics that constitute great improvements over known approaches to small animal and rodent control methods. The individual components that have been assembled into the new system that will be described herein, form an animal control kit that comprises a unique combination of elements that have never been presented and used strictly for the purpose of controlling small animals and/rodents.

Turning attention now to FIGS. 1 and 2, a first component of the kit of the invention comprises a projectile firing or launching device 10. A preferred device is in the form of a gun that is powered by compressed gas or compressed air, and which fires a frangible projectile that is preferably in the form of a spherical ball 60 (FIG. 3) at a low velocity. The gun 10 referred to herein, is commonly known as a paintball gun. The gun 10 is generally conventional in its structure and workings and is comprised of an elongated barrel 12, a pistol grip 16, a trigger 18, a paintball feed tube 20 for providing a supply of paintballs into the gun, and a compressed gas cartridge 25 for supplying a pressurized source of compressed propellant gas such as $CO_2$, for launching the paintballs 60 (FIG. 3) from the gun 10. It is envisioned that the present invention is also adaptable for use with other types of guns whereby the person firing the gun must use a spring or pump-action to compress a volume of air instead of the self-contained gas cartridge to fire the projectile out of the gun. As with most conventional paintball guns, feed tube 20 is inclined off to one side of barrel 12 for queuing up several paintballs at a feed port 22 entrance that is in communication with the firing chamber 13 of barrel 12, as best exemplified in FIG. 2. In this figure, the gun is further seen to include a bolt 24 that is disposed within firing chamber 13. The bolt 24 can be urged forward and backwards within firing chamber 13 in an axial direction along the length of barrel 12 for the purpose of reloading the gun with a new paintball 60 from the feed tube 20. The bolt 24 as presented in FIG. 2, is shown to be in a position within firing chamber 13 at a time of firing, where a measured amount of compressed gas has been supplied and communicated from cartridge 25 upon pulling of trigger 18, through an internal passageway 26 formed within bolt 24, to impact against the paintball 60. The paintball 60' reflects the position of a paintball after it has been acted upon by the compressed gas such that it is being propelled through firing chamber 13 for eventual discharge out of the barrel end 14 towards the desired target.

Figure 5:
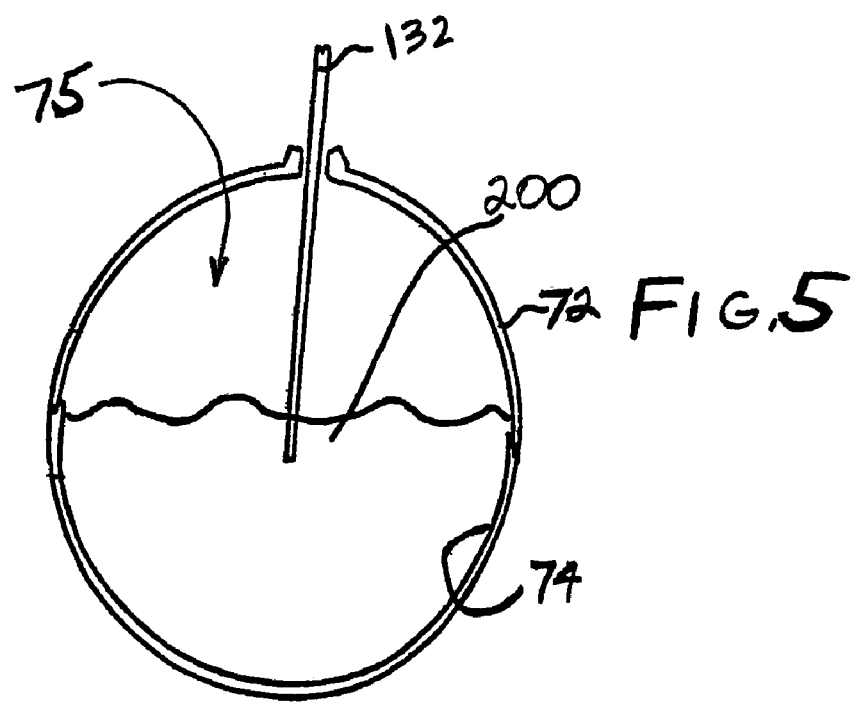
FIG. 5 is a cross sectional view of a paint ball shell being filled with the control liquid that is used in accordance with the invention.

Turning attention to FIG. 3, a sealed paintball 60 of a preferred type and construction that is used in the system and methodology of the invention is shown. The sealed paintball is generally comprised of a spherical paint ball shell that is formed from a pair of complimentary hemisphere portions 62 and 64 that are permanently joined and sealed together by either ultrasonic or solvent welding, both known methods of joining to those in the art. When assembled together, the edges of the hemisphere portions 62 and 64 define an circumferential equator 80 and the shell is defined by an integral, exterior wall 72. As seen in FIG. 4, either the first portion 62 or the second portion 64 may contain a fill port 66 for filling the interior cavity 75 (See FIG. 5) paintball shell with a liquid control agent. In this instance, the fill port 66 has been provided in first portion 62 and it is comprised of a circular, upstanding protuberance 68 that will be collapsed within the interior cavity 75 when the port is sealed, as will be explained later herein. As seen in FIG. 5, paintball shell 60 also has an interior wall 74 which defines the interior cavity 75 when the hemispheric portions 62 and 64 are welded together. A control liquid 200 is also shown partially occupying the interior cavity 75 and this control liquid is unique in that it comprises a urine, marking gland oil, or a combination of urine and oil, of a known predator to the animal or rodent that is to be controlled. The importance of this control liquid will be understood later when the function of the invention is described. The control liquid 200 is communicated into interior cavity 75 through the tip 132 of a hypodermic needle (FIG. 7A) that is seen penetrating the fill port 66.

After much experimentation with various other types of paintball projectiles, the paintball shell 60 that was found to be ideal for use when practicing the invention should be fabricated from thermoplastic linear polymers. The thermoplastic linear polymers are preferred because they are brittle, linear polymers, such as polystyrene, which are easily moldable, relatively inexpensive, and commercially available. This preferred type of paintball is commercially sold by Perfect Circle Paintball, Inc., whose website is www.pcpaintball.com. More importantly, it was discovered that with this preferred paintball, various advantages could be realized when practicing the invention if the construction of the paintball shell 60 was made from a linear polymer. First and foremost, a linear polymer shell 60 is impervious to liquids and does not dissolve when externally contacted by sweat or when placed in a warm, humid environment. Being impervious to sweat and humidity is an especially important factor when choosing a projectile for use within the kit of the invention. The methodology in practicing the invention of controlling small animals and rodents, will usually take place in the attic of a house where the small animal or rodent nests. The animal control professional who will be using the system of the invention will be handling and loading the paintball projectiles while maneuvering within an extremely hot attic environment, meaning that he will usually be sweating profusely. For that reason alone, it was discovered that the typical gelatin type of paintball would literally "melt" in the user's hands prior to being loaded and used.

Furthermore, the water impervious nature of a linear polymer shell allows the projectile to be used with a variety of liquids and other items that are normally unsuitable for placement in known gelatin paintball shells. For instance, it was discovered that when the paintball shells were made from thermoplastic linear polymers, they could be filled with and retain the predator urines and predator oils for an indefinite amount of time without melting, even though these liquids have an acidic PH balance. With gelatin paintball shells on the otherhand, it was discovered that the liquid predator urines and/or oils would melt the paintball shells in a relatively short period of time, sometimes instantaneously, even when glycols were added to the liquids to prevent the decay of the shell. For example, the applicant found that when a gelatin paintball projectile was filled with the predator urine, it would melt even before it could be loaded into the paintball. Advantageously, paintball shells that are constructed of linear polymers allow the paintballs to be pre-loaded within the gun feed tube prior to use and/or stored within a storage container for several days prior to use.

Moreover, it was also discovered that linear polymer paintballs are structurally stiffer, meaning they can be more roughly handled and provide for rapid loading and launching of the paintball. Being structurally stiffer is another important feature of the projectile used within the kit as some applications require the user to carry the paintballs inside his pocket when he is crawling across beams or crawlspace floors to reach an area where he can obtain a clear shot at the target area. Furthermore, it was found that in the present application, such paintballs exhibit greater launch distances and superior breakage properties. For instance, the linear polymer paintball is typically aimed at a target area 50 feet or further away and it cracks into a plurality of small pieces upon impact with the target area, thereby exhibiting a tight, localized spread that produces an area drenching of the predator liquid contained within the paintball when compared to the more widely dispersed spread that one experiences with gelatin shell paintballs. It is highly desirable that the predator liquid saturate the point of impact because over time, the odor from the impact point will remain strong and concentrated, thereby prolonging its effectiveness to intimidate and scare-off the small animal or rodent.

Figure 8:
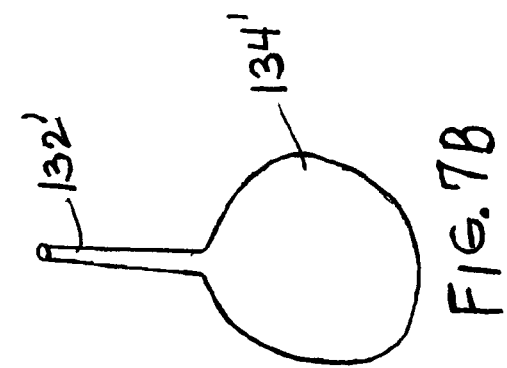
FIG. 8 is perspective view of containers of the control agent provided in the animal control kit of the invention and which is used in the practice of the invention.

Particularly preferred control agents for use in practicing the invention include urines from animals that are known to be the common, natural predators of the small animals or rodents that are to be controlled. These control agents have the power to naturally rebuff the small animal or rodent. However, in order for the control agents to effectively function as a natural repellant, the control agent must be locally dispersed about the nesting area. When speaking herein about an animal or rodent that is to be "controlled", it is meant that the animal or rodent will be tricked into believing that one of its natural predators is or has been present within the nesting area. This act of trickery is accomplished through an innate biological reaction occurring within the brain of the animal or rodent when the scent of the predator urine or marking oil is detected. The biological reaction causes a fear and intimidation response in the brain of the animal or rodent, such that it will voluntarily and permanently vacate the nest out of fear for its own life and the life of its young. For example, one natural predator of the female raccoon and her young is another male raccoon. Male raccoons, in their innate quest to rule the nest, are known to attack the young. That is why female raccoons will isolate her young from all contact with the world outside the nest until they are old enough to fend for themselves. An effective control agent in the form of male raccoon urine, when dispersed about the nest, will control a family of nesting raccoons such that the entire family will uproot itself within hours of the application whereby they will never return again. In the specific application of removing raccoons, only male raccoon urine is effective; female raccoon urine will not work. In all other applications mentioned hereinafter, male or female urine can be used. A container of male raccoon urine is shown at 200 in FIG. 8. As another example, the natural predator of a squirrel is the red fox; therefore, when controlling squirrels, the male or female urine of a red fox will be used as the control agent. A container of red fox urine is shown at 210 in FIG. 8. Another, more universal and natural predator of small animals and rodents is the wolf and a container filled with male or female wolf urine would also make an effective control agent. A container of the wolf's urine may also be included as part of the kit of the invention, although not shown in the drawings figures, as it would be readily understood by those in the art.

These natural control agents do not require a carrier substance to successfully deliver and disperse them about the desired target area. In fact, when producing the paintball projectiles of the invention, the weight of the volume of the predator liquids inside the projectile are sufficient to create a flight path that is straight and capable of reaching the desired target at a velocity necessary to impact the target with enough energy so to completely destroy the shell of the paintball projectile. As should be appreciated, an effective, safe and natural animal control method is realized without experiencing any of the previously mentioned drawbacks that are present with the animal control methods that are currently being used.

It has been discovered through experimentation that the effectiveness in delivering the natural control agents to a target are maximized by filling the capsules to at least 50%, preferably 75% to less than 100%, and more preferably to 85% to 95% of their maximum volume. It was found that it is not desirable to attempt a 100% fill because the predator liquids spill from the projectile, many times on the hands and clothes of the user. The stench of urine-soaked clothing is unacceptable for daily use by an animal control professional. Thus, the present inventor has discovered that the optimum fill range is between 90-95% to avoid spillage and to ensure urine dispersion in a sufficient transverse direction to produce a saturated, localized soaking of the target. When the paintball projectiles are filled in the 50% to 85% range, the path or trajectory of the paintball is effected at distances over 50 feet and several paintballs have to be used in order to leave a satisfactory volume of liquid at the target.

Figure 7A:
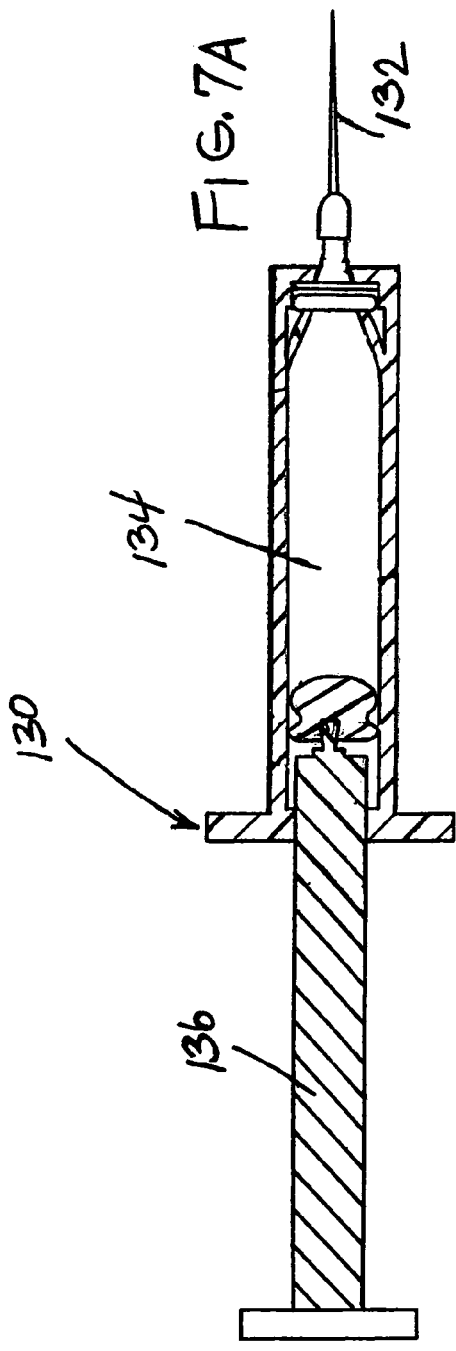
FIG. 7A is perspective view of a preferred embodiment of the storage and transfer means present invention.
Figure 7B:
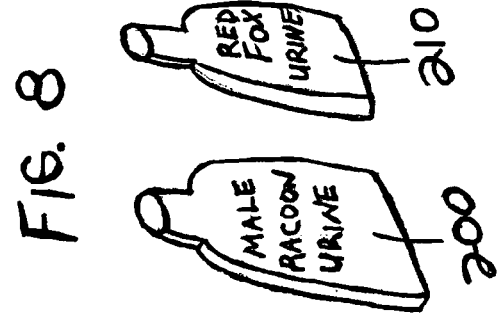
FIG. 7B is perspective view of another embodiment of the storage and transfer means.
Figure 7C:
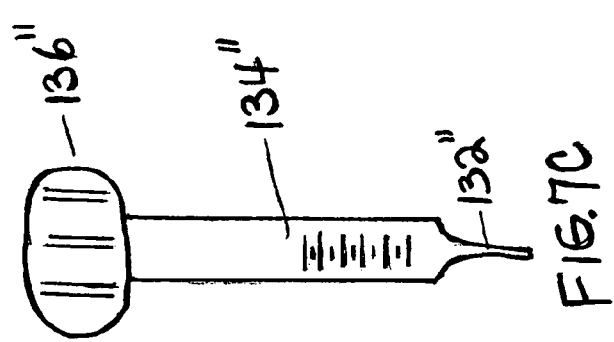
FIG. 7C is perspective view of a third embodiment of the storage and transfer means.

A storage and transfer means for transferring the control liquid out of its container, 200 or 210, is shown in FIGS. 7A-7C. The preferred storage and transfer means is in the form of a hypodermic needle 130, shown in FIG. 7A, which has a needle tip 132, a storage reservoir 134, and a handle and plunger combination 136. The needle tip 132 is formed with a channel 133 therein that is in fluid communication with the storage reservoir 134. By inserting the tip 132 into the storage container 200 or 210, and then pulling backwards on the handle 136, the control liquid will be transferred from within the container and into the storage reservoir 134. The needle tip 132 is inserted within the cavity 75 of the paintball 60 as shown in FIG. 5, whereby the handle 136 is depressed into the reservoir so that the control liquid is acted upon, causing it to be transferred out of the storage reservoir and into the paintball. Likewise, a second embodiment of a storage and transfer means is shown in FIG. 7B, which now comprises a bulb diffuser 130', which has a hollow tip 132' that is in fluid communication with the reservoir section 134'. The tip 132' is inserted within the container 200 or 210 of the desired control agent and then the air is displaced out of reservoir 134' by squeezing the reservoir section, which causes a vacuum in that section when it is released. The vacuum draws the control fluid up tip 132' into reservoir 134', where it can now be transferred into the paintball. To effectuate the transfer, the tip 132' is inserted into the fill port 66 of the paintball 60 and then the reservoir 134' is squeezed, thereby causing the fluid within the reservoir 134' to be communicated through hollow tip 132' and into the paintball cavity 75.

A third embodiment of the storage and transfer means is shown in FIG. 7C and this embodiment comprises a baister which has an extended reservoir section 134" that has an integral hollow tip 132" formed on one end and a deformable bulb 136" on the opposing end. The control fluid is transferred into the reservoir by placing the hollow tip 132" into the container 200 or 210 and then squeezing the bulb 136" so as to displace the air out of the reservoir section 134". When the bulb is released, a vacuum is created, whereby the control liquid is transferred from the container into the reservoir 134". The liquid is stored in the reservoir 134" until the hollow tip 132" is inserted into the fill port 66 of the paintball 60. Again squeezing the bulb 136" will cause the control fluid to be transferred from reservoir 134" into cavity 75 of the paintball.

In another embodiment, the gun 10 may be provided with an ammunition magazine clip 30 like the type shown in FIG. 6. The ammunition magazine clip 30 provides a gravity feed of a plurality of paintball projectiles 100 into the gun feed port 22 so that the shooter will effectively be provided with a continuous and relatively unending supply of projectiles when firing the gun 10. The paintball projectiles 100 are formed of an extremely hard, solid nylon materials and these paintballs are sold by Engineering Laboratories, Inc., located at 360 W. Oakland Avenue, Oakland, N.J. Because paintball 100 is a solid, spherically shaped paintball with no other redeeming features, it is not shown in the drawings figures because it can be readily understood by those in the art. A common problem encountered with paintball guns involves bridging of the paintballs within the feed port 22 at or near the entrance to the firing chamber 13. The bridging problem results in the failure of the balls to provide a continuous queuing of a rapid supply of projectiles into gun 10. Through provision of an ammunition magazine clip 30, the user will be ensured that a paintball projectile will always be fired from the gun whenever the trigger 18 is pulled. In some situations of use, as will become clearer later herein, it is of utmost importance that a continuous supply of projectiles be fired from the gun when the demand calls. Furthermore, it is desirous that a projectile actually fire from the gun each time a demand is placed upon the compressed gas cartridge 25 in order to improve the utility of the cartridge prior to its complete exhaustion.

The ammunition magazine clip 30 generally comprises an enclosed chamber 32 having an upper opening 34 and a lower opening 36. The first opening 34 is intended for loading a plurality of paintball projectiles into the chamber, therefore, this opening is rather large when compared to the diameter of a paintball. The exact positioning of the first opening 34 in the ammunition magazine clip 30 may be anywhere around the periphery of the magazine, but it is preferred to place the first opening 34 on the upper portion thereof so that paintball projectiles 60 already loaded into the magazine will not spill out when the opening 34 is used for inserting additional projectiles. Typically, this first opening is fitted with a spring-loaded, frictionally retained cap 38 so that the chamber 32 is essentially closed when the chamber is not actually being filled. The second opening 36 is on the lowermost portion at the point of connection between an externally connected vertical dispensing tube 40 and the gun barrel feed tube 20. The vertical dispensing tube 40 is used to provide the queue of paintball projectiles 50 to the firing chamber 13 of the gun 10. It will typically have an internal diameter slightly larger than the paintball projectile diameter but if the diameter of feed tube 20 is too large, bridging of the projectile queue can occur in the dispensing tube 40 itself. It is preferred that the dispensing tube 40 be attached tangentially to both the magazine 30 and the gun 10. In some applications the dispensing tube 40 may be oriented at an angle between the ammunition magazine 30 and the gun 10. A removable cover or lid (not shown) may be used to cover opening 36 in order to prevent loaded paintballs from spilling out of chamber 32 when the ammunition magazine clip 30 is not attached to gun 10.

The closed chamber 32 of the ammunition magazine clip 30 is sized so that a significant number of paintball projectiles can be placed inside the chamber. The magazine clip 30 is provided with internal bottom surface 48A and 48B that are both sloped downward towards the second opening 36 so that gravity flow of paintballs will occur and prevent projectiles from getting isolated in the corners. To prevent bridging problems, the ammunition magazine clip 30 of the type shown is typically provided with a dam 52. As seen in FIG. 7, the bottom surface 48B near vertical dispensing tube 40 is relatively higher near the dam 52 compared to surface 48A, thereby forming a holding chamber for some of the paintballs. The arrangement of the dam 52 and the holding chamber collectively prevent bridging around the second opening 36.

In practicing the invention, a method will now be disclosed on how to accomplish exercising control over a small, wild animal and/or rodent. The method presumes that the animal control professional has already transported the kit to the jobsite area where the small, wild animal or rodent is known to be nesting; this nesting area will be referred to hereinafter as the target area. The first step involves filling a plurality of the hollow projectiles with the predator control agent using the portable means for storing and transporting. As should be realized, the kit will contain a supply of several types of a urines or glandular oils from several known predators of the most common type of small animal or rodent being controlled. The control professional will either rely on information provided to him or personally verify the type of animal or rodent that is occupying the target area and he will then choose the most appropriate control liquid from the kit based on that information. In the preferred embodiment, the storage and transportation means comprises a hypodermic needle in which the tip will be lowered into the container of the control liquid and then the handle will be manipulated to draw the control agent liquid into the storage area of the needle. The needle tip is then inserted into the fill port 66 of the paintball 60, as shown in FIG. 5. The internal cavity 75 of the paintball 60 is then filled by releasing the control liquid from the storage area of the hypodermic needle by pushing the handle inward. The paintball cavity 75 is then filled to the optimum fill ranges previously disclosed herein. The step of sealing the filled paintballs must then take place, and that step can be accomplished in one of two ways. One is to apply a small dab of pure silicone caulk over the filled port opening 66 and letting it set, which in this case usually takes a few minutes. The second and preferred method for sealing the paintballs is to heat the tip 132 of the needle 130 with a cigarette lighter (not shown) and to then touch the heated tip to the protuberance 68 of the fill port 66. The heat will collapse the protuberance, thereby sealing the fill port 66. The next step is to load the sealed paintballs into a launching device. After the paintballs are loaded, they are ready for use. The next step is to direct the launching device towards the target area. Once directed, the trigger of the gun is then consecutively actuated so as to propel a plurality of filled projectiles to the target area, whereby the projectiles explode upon reaching the target area, thereby distributing the control agent locally about the target area.

According to another aspect of the invention, a second embodiment of the method is disclosed for exercising control over a small, wild animal and/or rodent. This method is to be used when the animal control professional arrives at the job site to discover that the wild animal or rodent is actually present within the target area (nest). In those situations, the control professional is potentially subjecting himself to grave danger of attack once he physically enters an area that the animal or rodent is protecting. Therefore, it has been determined that it is best to incapacitate the animal or rodent before attempting to launch the paintballs that will saturate the target area. Otherwise, if the control professional did not take this precaution, the animal or rodent could become extremely angered and attack the control professional. Therefore, once it has been determined what kind of animal or rodent is in the nest, the control professional must first fill a plurality of hollow projectile paintballs with the correct predator control agent. Filling is performed exactly as described in the control method mentioned immediately above. The next step in this method is to fill the magazine clip with the solid nylon paintballs or hard compressed rubber paintballs, which are well known. When finished, the clip is attached to the paintball gun and the control professional is then ready to incapacitate the animal or rodent. This step is accomplished by first directing the paintball gun directly at the animal and/or rodent. Because the paintball gun has excellent distance launching capabilities, the control professional will not have to draw closer towards the target area. The next step is to then consecutively pull the trigger of the gun and activate it so that a successive plurality of hard nylon paintballs or compressed rubber paintballs are launched directly at the animal or rodent, thereby striking it in succession. The force of each blow will be large enough to temporarily incapacitate the animal or rodent without killing it; in some cases, the small animal or rodent may be rendered unconscious. The next step is to then remove the ammunition clip 30 from the gun 10 and then to perform the step of loading the paintballs that are filled with the control agent into the feed tube 22 of the gun 10. The gun 10 is then directed at the target area and once properly aimed, the trigger of the gun is successively activated so as to launch a successive plurality of filled paintballs to the target area, where they explode upon impact to distribute the predator urines, oils or a combination thereof. When the animal or rodent regains its full capacities and/or consciousness, it will smell the scent of its predator, thereby triggering the biological reaction within its brain, causing it to become extremely fearful and intimidated, such that it will immediately leave the nesting area, never to return.

Although the invention has been described with reference to particular embodiments, it is to be understood that these embodiments are merely illustrative of the application of the principals of the invention. Numerous modifications may be made therein and other arrangements may be devised without departing from the spirit and scope of the invention which is described in the following claims.

I claim:

1. A method for exercising control over one of a small wild animal and rodent that is controlling and defending a target area, said method comprising the steps of:
   a) providing a projectile launching device;
   b) providing at least one spherically shaped projectile, said projectile comprising a hollow shell that defines an internal cavity;
   c) providing a supply of a control agent that is to be dispersed in said target area, said control agent comprised of a natural repellant to said small wild animal and rodent, said natural repellant comprised of one of a urine, a marking gland oil and a combination thereof, provided from a known predator of one of said small wild animal and rodent;

d) providing a portable transfer and storage means for temporarily storing a portion of the control agent that is to be transferred to said at least one projectile;

e) manipulating the transfer and storage means to draw a portion of said control agent into temporary storage therein;

f) transferring said control agent from said transfer and storage means into said at least one projectile so as to substantially fill said cavity;

g) sealing said at least one projectile to prevent leakage of said control agent;

h) loading said at least one projectile into said projectile launching device;

i) directing said launching device towards said target area; and j) actuating said launching device so as to launch at least one projectile towards said target area, whereby said projectile explodes upon impact with said target area to distribute said control agent about the target area, wherein the distribution of said control agent about said target area causes said one of said small animal and rodent to voluntarily and permanently vacate said target area.

2. The method of claim 1, wherein said control agent causes a biological reaction in the brain of one of said wild animal and rodent, said reaction creating a state of fear and intimidation within said animal and rodent.

3. The method of claim 1, wherein said portable transfer and storage means is comprised of one of a hypodermic needle, a bulb diffuser, and a baister.

4. The method of claim 1, wherein said launching device is comprised of a paintball gun that is powered by a source of compressed gas, said compressed gas comprised of one of compressed air and compressed carbon dioxide.

5. The method of claim 1, wherein said at least one projectile is a paintball that is made from a thermoplastic linear polymer.

6. The method of claim 1, wherein the paintball shell has a fill port formed therein, said fill port is in communication with said cavity.

7. The method of claim 1, wherein said urine and marking gland oil is comprised of one of a male raccoon urine, a red fox urine and a wolf urine.

8. A method for removing a small wild animal or rodent that is nesting within a target area, said method comprising the steps of:

a) providing a projectile launching device;

b) providing an ammunition magazine clip that is adopted for receiving solid spherically shaped projectiles;

c) filling said magazine clip with a plurality of solid, spherically shaped projectiles;

d) attaching said magazine clip to said projectile launching device;

e) providing at least one spherically shaped projectile, said projectile comprising a hollow shell that defines an internal cavity;

f) providing a supply of a control liquid that is to be dispersed in said target area;

g) providing a portable transfer and storage means for temporarily storing a portion of the control liquid that is to be transferred to said at least one projectile;

h) manipulating the transfer and storage means to draw a portion of said control liquid into temporary storage therein;

i) transferring said control liquid from said transfer and storage means into said at least one projectile so as to substantially fill said cavity;

j) sealing said at least one projectile to prevent leakage of said control liquid;

k) directing said launching device towards said target area;

l) consecutively actuating said launching device so as to launch said plurality of projectiles from within said ammunition clip directly at said wild animal and rodent so as to successively strike said animal and rodent, thereby temporarily incapacitating said animal;

m) removing said magazine clip from said launching device;

n) loading said at least one projectile into said projectile launching device;

o) redirecting said launching device towards said target area; and p) actuating said launching device so as to launch at least one projectile towards said target area, whereby said projectile explodes upon impact within said target area to distribute said control agent about the target area.

9. The method of claim 8, wherein the distribution of said control agent about said target area causes a biological reaction in said wild animal and said rodent, said reaction creating a state of fear and intimidation within said animal and rodent so as to cause it to voluntarily and permanently vacate said target area.

10. The method of claim 8, wherein said control agent is comprised of a urine taken from a known natural predator of said small wild animal and rodent.

11. The method of claim 8, wherein said solid spherically shaped projectiles are formed of one of solid nylon and compressed rubber.

12. The method of claim 8, wherein said hollow spherically shaped projectiles are made from a thermoplastic linear polymer, said projectile includes a fill port formed therein.

13. The method of claim 8, wherein said launching device is a paintball gun that is powered by a source of compressed gas, wherein said compressed gas is one of compressed air and compressed carbon dioxide.

14. The method of claim 10, wherein said urine is comprised of one of a male raccoon urine, a red fox urine and a wolf urine.

15. A portable, small animal and rodent control kit comprising:

a plurality of frangible, spherically shaped projectiles, each identically comprised of a hollow shell that defines an internal cavity, and wherein said cavity is in communication with a fill port formed in said shell, each projectile comprised of a hollow shell formed of a thermoplastic linear polymer;

a projectile launching device that includes a pressurized gas source for launching a projectile from within;

an ammunition magazine clip for attachment to said projectile launching device, said magazine clip further including therein, a plurality of solid paintballs comprising one of nylon and compressed rubber;

a portable transfer and storage means for temporarily storing therein a portion of said control liquid that is to be transferred into said cavity of said projectiles; and a supply of a control liquid that is comprised of one of a urine, a marking gland oil and a combination of urine and marking gland oil from a natural predator of the small wild animal and rodent being controlled, and said urine is one of a male raccoon urine, a red fox urine and a wolf urine.

16. The control kit of claim 15, wherein said launching device is a paintball gun and said spherically shaped projectiles are paintballs formed of a linear thermoplastic material.

17. The control kit of claim 15, wherein said portable transfer and storage means is comprised one of a hypodermic needle, a bulb diffuser, and a baister.

* * * * *